US012256187B2

(12) United States Patent
Gao

(10) Patent No.: US 12,256,187 B2
(45) Date of Patent: Mar. 18, 2025

(54) ELECTRONIC DEVICE AND INFORMATION PROCESSING METHOD

(71) Applicant: Lenovo (Beijing) Limited, Beijing (CN)

(72) Inventor: Xiaoju Gao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 256 days.

(21) Appl. No.: 18/055,089

(22) Filed: Nov. 14, 2022

(65) Prior Publication Data

US 2023/0217151 A1 Jul. 6, 2023

(30) Foreign Application Priority Data

Dec. 31, 2021 (CN) ......................... 202111673197.1

(51) Int. Cl.
*H04R 1/10* (2006.01)
*G10K 11/16* (2006.01)

(52) U.S. Cl.
CPC ....... *H04R 1/1041* (2013.01); *H04R 2430/01* (2013.01)

(58) Field of Classification Search
CPC .......................... H04R 1/1041; H04R 2430/01
USPC .................................................. 381/74, 71.1
See application file for complete search history.

(56) References Cited

FOREIGN PATENT DOCUMENTS

| | | | |
|---|---|---|---|
| CN | 102118670 A | | 7/2011 |
| CN | 102118670 B | * | 10/2013 |
| CN | 109086024 A | | 12/2018 |

* cited by examiner

*Primary Examiner* — Ammar T Hamid
(74) *Attorney, Agent, or Firm* — ANOVA LAW GROUP, PLLC

(57) ABSTRACT

An electronic device includes: an outer case, at least a portion of the outer case being configured to maintain a positional relationship between the electronic device and a wearer's ear; a first sound generator and a second sound generator both provided inside the outer case; and a controller configured to control the first sound generator and the second sound generator to output sounds.

19 Claims, 7 Drawing Sheets

ELECTRONIC DEVICE AND INFORMATION PROCESSING METHOD

CROSS-REFERENCE TO RELATED APPLICATION

This application claims priority to Chinese Patent Application No. 202111673197.1, filed on Dec. 31, 2021, the entire content of which is incorporated herein by reference.

TECHNICAL FIELD

The present disclosure relates to the technical field of information technologies and, more particularly, to an electronic device and an information processing method.

BACKGROUND

Electronic devices are frequently used devices by people. However, current electronic devices are too simplistic to adapt various application scenarios.

Small size earphones have the advantages of small dimension, light weight, and easy portability, and hence are widely used. However, due to the small dimension of the small size earphones, generally only one sound unit is provided in the earphone, making it difficult to achieve a relatively loud sound and a relatively good sound effect.

SUMMARY

One aspect of the present disclosure provides an electronic device. The electronic device includes: an outer case, at least a portion of the outer case being configured to maintain a positional relationship between the electronic device and a wearer's ear; a first sound generator and a second sound generator provided inside the outer case; and a controller configured to control the first sound generator and the second sound generator to output sounds.

In some embodiments, the outer case includes a first structure and a second structure that are fixedly connected to each other. A volume parameter of the first structure satisfies an in-ear condition, and the first structure includes an accommodation space configured to accommodate the first sound generator and the second sound generator. The second structure is configured to maintain the positional relationship between the electronic device and the wearer's ear.

In some embodiments, the outer case includes a first part and a second part. A volume parameter of the first part is greater than a volume parameter of the second part, and the first part includes an accommodation space configured to accommodate the first sound generator and the second sound generator. The volume parameter of the first part satisfies an in-ear condition, and the first part is configured to maintain the positional relationship between the electronic device and the wearer's ear.

In some embodiments, a sound-emitting hole is configured on the outer case. A center of the first sound-emitting hole, a center of the first sound generator, and a center of the second sound generator are sequentially arranged along an axis.

In some embodiments, the sound-emitting hole is a first sound-emitting hole and the axis is a first axis. The outer case further includes a second sound-emitting hole and a third sound-emitting hole that are symmetrically arranged. A center between the first sound generator and the second sound generator, a center of the second sound-emitting hole, and a center of the third sound-emitting hole are arranged along a second axis, the second axis being different from the first axis.

In some embodiments, the outer case includes a first accommodation space and a second accommodation space. The first accommodation space and the second accommodation space are continuously connected to each other. The first accommodation space is smaller than the second accommodation space. The first sound generator is provided in the first accommodation space and the second sound generator is provided in the second accommodation space. A volume of the first sound generator is smaller than a volume of the second sound generator.

In some embodiments, the first sound generator includes a diaphragm. The second sound generator includes an iron plate disposed in a magnetic field.

Another aspect of the present disclosure provides an information processing method. The method includes: controlling a first sound generator provided in an outer case of an electronic device to output audio data, at least a portion of the outer case being configured to maintain a positional relationship between the electronic device and a wearer's ear; and in response to a condition being satisfied, controlling at least a second sound generator provided in the outer case of the electronic device to out audio data, the second sound generator being different from the first sound generator.

In some embodiments, a first sound volume of the audio data outputted from the first sound generator is smaller than a second sound volume of the audio data outputted from the second sound generator. In response to the condition being satisfied, controlling at least the second sound generator to output the audio data includes: in response to a sound volume adjustment condition being satisfied, controlling at least the second sound generator to output the audio data.

In some embodiments, controlling at least the second sound generator to output the audio data includes: based on a parameter representing a distance in the audio data, controlling one of the first sound generator and the second sound generator that is closer to a sound-emitting hole to output first audio sub-data, and controlling another one of the first sound generator and the second sound generator that is further away from the sound-emitting hole to output second audio sub-data.

In some embodiments, controlling at least the second sound generator to output the audio data includes: based on a parameter representing a sound type in the audio data, controlling one of the first sound generator and the second sound generator that is closer to the sound-emitting hole to output first audio sub-data, and controlling another one of the first sound generator and the second sound generator that is further away from the sound-emitting hole to output second audio sub-data.

In some embodiments, controlling at least the second sound generator to output the audio data includes: in response to the condition being satisfied and the audio data including a parameter representing a sound volume, controlling one of the first sound generator and the second sound generator that is closer to the sound-emitting hole to output the first audio sub-data, and controlling another one of the first sound generator and the second sound generator that is further away from the sound-emitting hole to output the second audio sub-data.

In some embodiments, controlling at least the second sound generator to output the audio data includes: in response to the condition being satisfied, based on a parameter representing a channel in the audio data, controlling one of the first sound generator and the second sound generator that is closer to a sound-emitting hole to output the first audio sub-data, and controlling another one of the first sound generator and the second sound generator that is further away from the sound-emitting hole to output the second audio sub-data.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

In the description of the embodiments of the present disclosure, it should be noted that, unless otherwise stated and limited, the term “connection” should be understood in a broad sense, for example, it may be an electrical connection, an internal communication between two components, or a direct connection, and may also be indirectly connected through an intermediate medium. Those of ordinary skill in the art could understand the specific meanings of the above term according to specific situations.

It should be noted that the terms such as “first\second\third” involved in the embodiments of the present disclosure are only used to distinguish similar objects, and do not represent a specific ordering of the objects. It is understood that the terms such as “first\second\third” may be interchanged in a specific order or sequence where permitted. It should be understood that the objects distinguished by the terms such as “first\second\third” distinctions may be interchanged under appropriate circumstances so that the embodiments of the present disclosure described herein may be practiced in sequences other than those illustrated or described herein.

Figure 1:
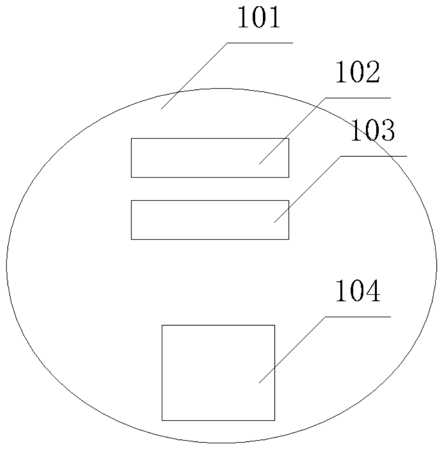
FIG. 1 is a schematic structural diagram of an exemplary electronic device according to some embodiments of the present disclosure.

FIG. 1 is a schematic structural diagram of an exemplary electronic device according to some embodiments of the present disclosure. As shown in FIG. 1, the electronic device includes an outer case 101, a first sound generator 102, a second sound generator 103, and a controller 104. At least a portion of the outer case 101 is configured to maintain a positional relationship between the electronic device and a wearer’s ear. The first sound generator 102 and the second sound generator 103 are disposed inside the outer case 101. The controller 104 is configured to control the first sound generator 102 and the sound generator 103 to output an audio sound.

The controller 104 is configured to control the first sound generator 102 and the second sound generator 103 to coordinate with each other to output the audio sound.

For example, the first sound generator 102 and the second sound generator 103 may simultaneously output the audio sound having a sound volume greater than a sound volume of the audio sound outputted by any one of the first sound generator 102 and the second sound generator 103, thereby achieving a loud sound volume of the outputted audio sound. In another example, the first sound generator 102 and the second sound generator 103 may output different audio sounds respectively. Compared with a sound effect of the electronic device having only one sound generator, coordinated outputs from two sound generators achieve a more desired sound effect.

In the embodiments of the present disclosure, one electronic device is used as an example for illustration. In actual implementations, two electronic devices may operate together or each electronic device may operate individually.

A circle is used in FIG. 1 to illustrate the outer case of the electronic device. In other embodiments, a shape of the outer case may be different and is not limited thereto. The shape of the outer case may be determined according to actual needs.

In some embodiments, the first sound generator 102 and the second sound generator 103 may generate identical audio sounds or may generate different audio sounds. The output of the audio sounds is controlled by the controller 104.

The audio sounds generated by the first sound generator 102 and the second sound generator 103 can be perceived by the wearer. The first sound generator 102 and the second sound generator 103 may generate identical audio sounds or may generate different audio sounds.

When the electronic device is used, the electronic device is worn on the wearer's ear. The outer case of the electronic device is designed to maintain a positional relationship with the wearer's ear.

The electronic device may be an earphone. For example, the earphone may be an on-ear type, an in-ear type, or other suitable types.

In some embodiments, for the on-ear earphone, the outer case may include a first structure and a second structure fixedly coupled to each other. Volume parameters or dimensions of the first structure satisfy an in-ear condition that allows the first structure to be accommodated in the ear. The first structure includes an accommodation space to accommodate the first sound generator and the second sound generator. The second structure can maintain the positional relationship between the electronic device and the wearer's ear.

When the wearer wears the electronic device, the first structure is inserted in the ear, and the second structure is located outside the ear for fixing the electronic device on the wearer's ear.

In some embodiments, the second structure may be an arc-shaped structure. The arc-shaped structure matches a connection part of the outer ear connecting to the head to achieve the fixing of the electronic device.

Specifically, that the volume parameters of the first structure satisfying the in-ear condition refers to that the volume parameters of the first structure match a part of an ear cavity. The part is a part of the middle ear connected to the pinna.

For example, the volume parameters include parameters such as a volume, a diameter, a shape, and/or a size.

Figure 2:
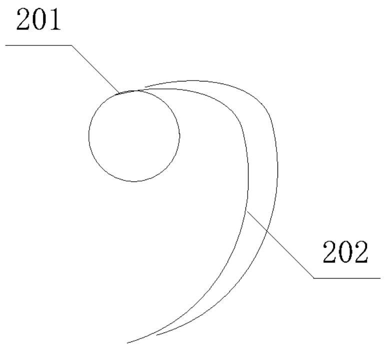
FIG. 2 is a schematic structural diagram of an outer case of an exemplary electronic device according to some embodiments of the present disclosure.

FIG. 2 is a schematic structural diagram of an outer case of an exemplary electronic device according to some embodiments of the present disclosure. As shown in FIG. 2, the outer case includes a first structure 201 and a second structure 202. The first structure 201 is a cylindrical structure. The diameter of the cylindrical shape satisfies the in-ear condition. The second structure 202 is a hook-like structure with a curvature, which can be hung on the connection part of the outer ear. FIG. 2 illustrates the structure of the outer case.

In some embodiments, the earphone is of an in-ear type. The outer case includes a first part and a second part. The volume parameters of the first part are greater than the volume parameters of the second part. The first part includes an accommodation space configured to accommodate the first sound generator and the second sound generator. The volume parameters of the first part satisfy the in-ear condition, and the first part can maintain the positional relationship between the electronic device and the wearer's ear.

The volume parameters of the first part satisfy the in-ear condition. When the wearer wears the electronic device, the first part is inside the ear, the second part is outside the ear, and the first part maintains the positional relationship between the electronic device and the wearer's ear, thereby achieving wearing of the electronic device.

The outer case includes at least two parts. The volume parameters of the first part are greater than the volume parameters of the second part. The volume parameters of an in-ear part of the earphone are greater than the volume parameters of a non-in-ear part (i.e., an out-of-ear part).

The first part having a larger volume includes the accommodation space configured to accommodate the two sound generators.

Specifically, that the volume parameters of the first structure satisfy the in-ear condition refers to that the volume parameters of the first structure match the part of the ear cavity. The part is a part of the middle ear connected to the pinna.

For example, the volume parameters include parameters such as a volume, a diameter, a shape, and/or a size.

The second part and the first part may have a similar structure or may have different structures.

For example, the first part is a cylindrical structure, and the second part is a cylindrical structure having smaller volume parameters. Alternatively, the first part is a cylindrical structure, and the second part is a cuboid structure having smaller volume parameters.

Figure 3:
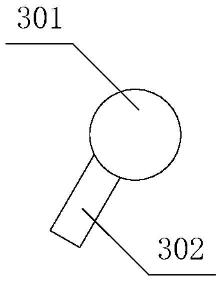
FIG. 3 is a schematic structural diagram of another outer case of an exemplary electronic device according to some embodiments of the present disclosure.

FIG. 3 is a schematic structural diagram of another outer case of an exemplary electronic device according to some embodiments of the present disclosure. As shown in FIG. 3, the outer case includes a first part 301 and a second part 302. The first part 301 is a cylindrical structure. The diameter of the cylindrical structure satisfies the in-ear condition. The second part 302 is a cuboid structure.

In some embodiments, to improve wearing comfort, a structure made of a flexible material, such as an earphone cap, may also be configured outside the first part.

The electronic device is further configured with a wired connection component. The electronic device is connected to other electronic equipment through the wired connection component to achieve data transmission with the other electronic equipment.

In some embodiments, the electronic device may also supply power to the structure inside the outer case of the electronic device through the wired connection component.

The electronic device further includes a communication unit configured to support the data transmission with the electronic device, and a power supply configured to supply power to the sound generators and the controller.

The electronic device may communicate with the electronic equipment for the data transmission through a wireless connection. The electronic device is configured with the communication unit to support the data transmission with the electronic equipment. The electronic device is configured with the power supply to supply power to power consuming structures in the electronic device.

In some embodiments, the power supply may be a battery.

In some embodiments, the electronic device is a true wireless stereo (TWS) earphone. The electronic device (i.e., the earphone) are provided in pairs, and a communication unit is provided inside the outer case of each earphone.

In some embodiments, the communication unit may support any one of the following communication technologies: Bluetooth, infrared, 2.4 GHz wireless, and the like.

The electronic device may include one earphone or may include two earphones provided in pairs.

For example, when the electronic device includes paired wireless earphones, the two earphones can be directly wirelessly connected to an audio playback device such as a personal computer (PC) and/or a mobile terminal (e.g., a mobile phone). In another example, when the electronic device includes paired wireless earphones, the two earphones may be a master earphone and a slave earphone. The master earphone is wirelessly connected to the audio playback device, and the slave earphone is wirelessly connected to the master earphone.

The electronic device including one outer case is illustrated in the embodiments of the present disclosure. But it is not limited thereto. The electronic device may include sub-devices provided in pairs, and each sub-device has the structure shown in FIG. 1. Each outer case is configured with the first sound generator, the second sound generator, and the controller, and the structure and internal space of each outer case can be symmetrically arranged.

The present disclosure provides the electronic device. The electronic device includes: the outer case, at least a part of which can maintain the positional relationship between the electronic device and the wearer's ear; the first sound generator and the second sound generator provided inside the outer case; and the controller configured to control the first sound generator and the second sound generator to output the audio sound. In the technical solution, the two sound generators are provided inside the outer case of the electronic device, and are controlled by the controller provided in the electronic device to output the audio sound. Configuring the two sound generators in one earphone facilitates the louder sound and/or the desired sound effect.

Figure 4:
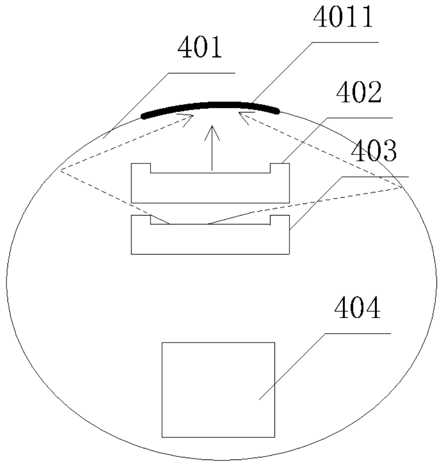
FIG. 4 is a schematic structural diagram of another exemplary electronic device according to some embodiments of the present disclosure.

FIG. 4 is a schematic structural diagram of another exemplary electronic device according to some embodiments of the present disclosure. As shown in FIG. 4, the electronic device includes an outer case 401, a first sound generator 402, a second sound generator 403, and a controller 404. For the descriptions of the structures and functions of the controller 404, references can be made to the descriptions of the previous embodiments, which will not be repeated herein.

The outer case 401 is configured with a first sound-emitting hole 4011. A center of the first sound-emitting hole 4011, a center of the first sound generator 402, and a center of the second sound generator 403 are sequentially arranged along a first axis.

Sound-emitting directions of the first sound generator 402 and the second sound generator 403 both face toward the first sound-emitting hole 4011.

In some embodiments, the first sound generator 402 and the second sound generator 403 are both symmetrically-shaped structures, such as circles, polygons, and the like.

The first sound-emitting hole 4011, the first sound generator 402, and the second sound generator 403 are sequentially arranged, and the centers of the three are sequentially arranged along the first axis.

The sound-emitting direction of the first sound generator 402 faces toward the first sound-emitting hole 4011, and a size of the first sound-emitting hole 4011 match a size of the first sound generator 402.

Moreover, the sound-emitting direction of the second sound generator 403 also faces toward the first sound-emitting hole 4011, and a size of the second sound generator 403 and the size of the first sound-emitting hole 4011 may be the same or different. The two sound generators shown in FIG. 4 have a same size.

The first sound generator 402 outputs a sound directly through the first sound-emitting hole 4011. The second sound generator 403 also outputs a sound directly through the first sound-emitting hole 4011. Dashed line arrows shown in FIG. 4 indicate the directions of the outputted sounds.

The two sound generators are sequentially arranged inside the outer case, and output the sound thereof louder than the sound outputted by only one sound generator.

Figure 5:
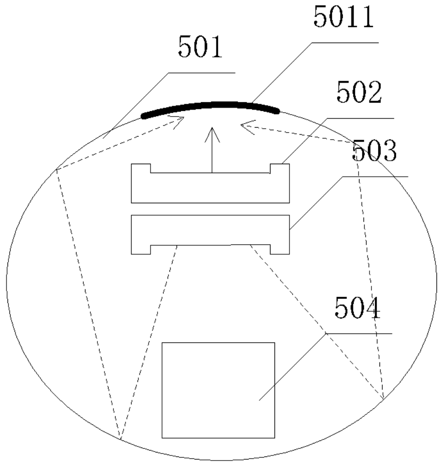
FIG. 5 is a schematic structural diagram of another exemplary electronic device according to some embodiments of the present disclosure.

FIG. 5 is a schematic structural diagram of another exemplary electronic device according to some embodiments of the present disclosure. As shown in FIG. 5, the electronic device includes an outer case 501, a first sound generator 502, a second sound generator 503, and a controller 504. For the descriptions of the structures and functions of the controller 504, references can be made to the descriptions of the previous embodiments, which will not be repeated herein.

The outer case 501 is configured with a first sound-emitting hole 5011. A center of the first sound-emitting hole 5011, a center of the first sound generator 502, and a center of the second sound generator 503 are sequentially arranged along a first axis.

A sound-emitting direction of the first sound generator 502 faces toward the first sound-emitting hole 5011, and a sound-emitting direction of the second sound generator 503 faces away from the first sound-emitting hole 5011. A sound outputted from the second sound-generator 503 is reflected by a wall of the outer case to emit from the first sound-emitting hole 5011.

In some embodiments, the first sound generator 502 and the second sound generator 503 are both symmetrically-shaped structures, such as circles, polygons, and the like.

The first sound-emitting hole 5011, the first sound generator 502, and the second sound generator 503 are sequentially arranged, and the centers of the three are sequentially arranged along the first axis.

The sound-emitting direction of the first sound generator 502 faces toward the first sound-emitting hole 5011, and a size of the first sound-emitting hole 5011 match a size of the first sound generator 502.

In some embodiments, the sound outputted from the second sound-generator 503 is reflected by the wall of the outer case to emit from the first sound-emitting hole 5011 together with a sound outputted from the first sound generator 502, such that the sound outputted from both sound generators is louder than the sound outputted from only one sound generator.

It should be noted that in the actual implementation, the sound-emitting directions of the first sound generator 502 and the second sound generator 503 may be determined according to an inner space of the outer case.

For example, when the inner space of the outer case is large, the two sound generators may be arranged in opposite directions, and the sound-emitting direction of the second sound generator 503 is opposite to the sound-emitting direction of the first sound generator 502. When the inner space of the outer case is small, the two sound generators may be arranged in a same direction, and the sound-emitting directions of both the first sound generator 502 and the second sound generator 503 face toward the first sound-emitting hole 5011. In another example, when the inner space of the outer case is small, the two sound generators may be arranged in opposite directions, and when the inner space of the outer case is large, the two sound generators may be arranged in a same direction.

In some embodiments, an inner wall and/or an outer wall of the outer case may be coated with a composite material to improve the sound effect.

For example, the coated composite material may be a 3-layer composite material. The 3-layer composite material can be made of PEEK (polyetheretherketone)+damping glue+PEEK, PAR (Polyarylate)+damping glue+PAR, PET (Polyethyleneterephthalate)+damping glue+PET, PEI (Polyetherimide)+damping glue+PEI, or PEN (Polyethylene naphthalate two formic acid glycol ester)+damping glue+PEN, etc. In another example, the coated composite material may be a 5-layer composite material. The 5-layer composite material can be PEEK+damping glue+PET base material+damping glue+PEEK, PAR+damping glue+PET base material+damping glue+PAR, PET+damping glue+PET base material+damping glue+PET, PEI+damping glue+PET base material+damping glue+PEI, or PEN+damping glue+PET substrate+damping glue+PEN, etc.

The present disclosure provides the electronic device in which the outer case is configured with the first sound-emitting hole, and the center of the first sound-emitting hole, the center of the first sound generator, and the center of the second sound generator are sequentially arranged along the first axis. In this technical solution, the sounds outputted from the two sound generators are both emitted outward through the first sound-emitting hole provided in the outer case, and the sound thereof can be louder than the sound of only one sound generator.

Figure 6:
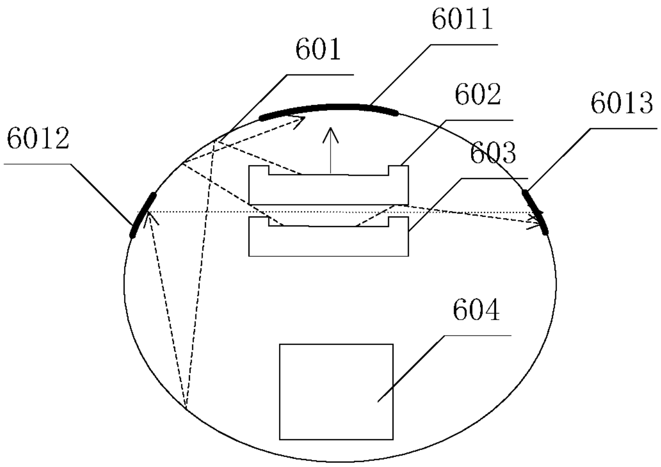
FIG. 6 is a schematic structural diagram of another exemplary electronic device according to some embodiments of the present disclosure.

FIG. 6 is a schematic structural diagram of another exemplary electronic device according to some embodiments of the present disclosure. As shown in FIG. 6, the electronic device includes an outer case 601, a first sound generator 602, a second sound generator 603, and a controller 604. The outer case 601 is configured with a first sound-emitting hole 6011, and a second sound-emitting hole 6012 and a third sound-emitting hole 6013, both of which are symmetrically arranged. For the descriptions of the structures and functions of the first sound-emitting hole 6011 and the controller 604, references can be made to the descriptions of the previous embodiments, which will not be repeated herein.

The second sound-emitting hole 6012 and the third sound-emitting hole 6013 are symmetrically arranged at the outer case.

A center between the first sound generator 602 and the second sound generator 603, a center of the second sound-emitting hole 6012, and a center of the third sound-emitting hole 6013 are sequentially arranged along a second axis. The second axis is different from the first axis.

The two sound generators are separated by a certain interval. The center between the two sound generators, the second sound-emitting hole 6012, and the third sound-emitting hole 6013 are arranged at one axis.

As shown in FIG. 6, the first sound generator 602 and the second sound generator 603 are arranged facing toward a same direction, that is, the sound-emitting directions thereof are the same. Dashed line arrows shown in FIG. 6 indicate the directions of the outputted sounds.

FIG. 6 only shows exemplary directions of the outputted sounds. Specifically, the sounds outputted from the two sound generators may be emitted through the three sound-emitting holes.

In some embodiments, a portion of the sound outputted from the first sound generator 602 is emitted directly through the first sound-emitting hole 6011, and another portion of the sound is reflected by the inner wall of the outer case and is emitted through the second sound-emitting hole 6012 and the third sound-emitting hole 6013. The sound outputted from the second sound generator 603 is reflected by the back of the first sound generator 602, is further reflected by the inner wall of the outer case, and is emitted through the first sound-emitting hole 6011, the second sound-emitting hole 6012, and the third sound-emitting hole 6013. The sound emitted through the three sound-emitting holes is louder than the sound emitted through only one sound-emitting hole.

Figure 7:
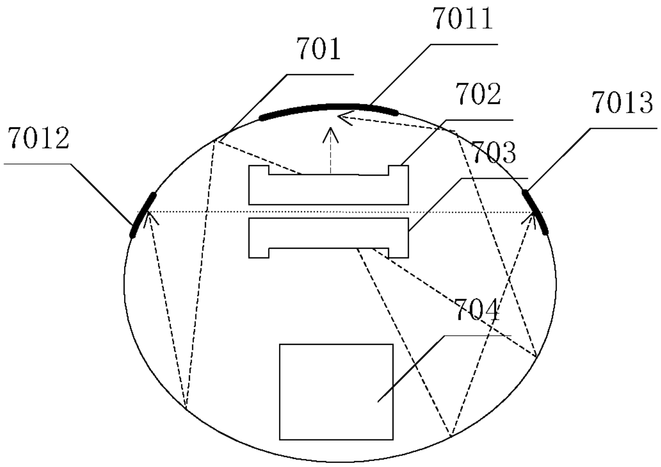
FIG. 7 is a schematic structural diagram of another exemplary electronic device according to some embodiments of the present disclosure.

FIG. 7 is a schematic structural diagram of another exemplary electronic device according to some embodiments of the present disclosure. As shown in FIG. 7, the electronic device includes an outer case 701, a first sound generator 702, a second sound generator 703, and a controller 704. The outer case 701 is configured with a first sound-emitting hole 7011, and a second sound-emitting hole 7012 and a third sound-emitting hole 7013, which are symmetrically arranged. For the descriptions of the structures and functions of the first sound-emitting hole 7011 and the controller 704, references can be made to the descriptions of the previous embodiments, which will not be repeated herein.

The second sound-emitting hole 7012 and the third sound-emitting hole 7013 are symmetrically arranged at the outer case.

Cross-sectional sizes and shapes of the second sound-emitting hole 7012 and the third sound-emitting hole 7013 are the same. A cross-sectional area of the first sound-emitting hole 7011 is larger than that of the second sound-emitting hole 7012.

As shown in FIG. 7, the first sound generator 702 and the second sound generator 703 are arranged opposite to each other, that is, the sound-emitting directions thereof are opposite. Dashed line arrows shown in FIG. 7 indicate the directions of the outputted sounds.

FIG. 7 only shows exemplary illustration of the directions of the outputted sounds. Specifically, the sounds outputted from the two sound generators may be emitted through the three sound-emitting holes.

In some embodiments, a portion of the sound outputted from the first sound generator 702 is emitted directly through the first sound-emitting hole 7011, and another portion of the sound is reflected by the inner wall of the outer case and is emitted through the second sound-emitting hole 7012 and the third sound-emitting hole 7013. The sound outputted from the second sound generator 703 is reflected by the inner wall of the outer case and is emitted through the first sound-emitting hole 7011, the second sound-emitting hole 7012, and the third sound-emitting hole 7013. The sound emitted through the three sound-emitting holes is louder than the sound emitted through only one sound-emitting hole.

In some embodiments, the electronic device is a semi-in-ear earphone. When the electronic device is worn by the wearer, the first part/first structure of the outer case is all inserted into the ear, such that the second sound-emitting hole 7012 and the third sound-emitting hole 7013 can be arranged in an area of the outer case that is not inserted into the ear. The sound emitted from the second sound-emitting hole 7012 and the third sound-emitting hole 7013 can be heard by the wearer.

In some embodiments, the electronic device is an in-ear earphone. When the electronic device is worn by the wearer, the first part/first structure of the outer case is all inserted into the ear, and positions of the second sound-emitting hole 7012 and the third sound-emitting hole 7013 correspond to the earphone caps. The earphone caps prevent the second sound-emitting hole 7012 and the third sound-emitting hole 7013 from being in contact with the inner wall of the ear cavity, thereby ensuring that the sound emitted from the second sound-emitting hole 7012 and the third sound-emitting hole 7013 can be heard by the wearer.

Figure 8:
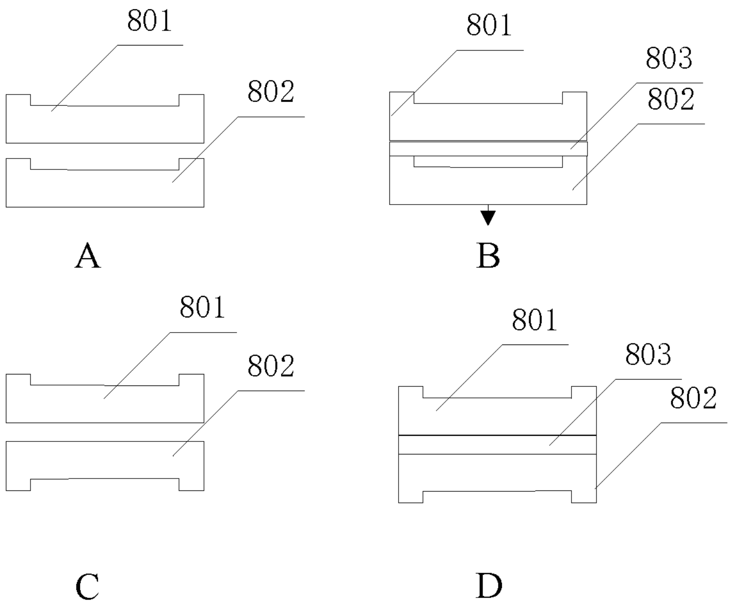
FIG. 8 is a schematic structural diagram of a sound generating unit of an exemplary electronic device according to some embodiments of the present disclosure.

FIG. 8 is a schematic structural diagram of a sound generator of an exemplary electronic device according to some embodiments of the present disclosure.

The first sound generator and the second sound generator are configured not to satisfy a vibration transfer condition.

In some embodiments, the first sound generator does not contact the second sound generator to reduce vibration energy transferred to another sound generator when one sound generator vibrates and emits the sound. That is, the two sound generators do not satisfy the vibration transfer condition. No contact between the two sound generators includes no physical contact and no contact through a rigid element.

The first sound generator and the second sound generator are separated by a certain gap. The two sound generators are separated by an air gap. Vibration of any one sound generator is not transferred to another sound generator.

In some embodiments, when a space inside the outer case of the electronic device is large, the two sound generators are separated by a gap such that the two sound generators do not contact each other, and do not satisfy the vibration transfer condition.

A spacer or a gasket may be provided between the first sound generator and the second sound generator. The two sound generators are separated by the spacer. Vibration of one of the two sound generators is not transferred to another sound generator.

In some embodiments, a shape of the spacer is consistent with a cross-sectional shape of the sound generators. The spacer is fixed between the first sound generator and the second sound generator through an adhesive material.

The spacer may be a non-rigid element. The spacer is able to absorb received vibration energy.

In some embodiments, when the space inside the outer case of the electronic device is small, the two sound generators are separated by the spacer such that the two sound generators do not contact each other, and do not satisfy the vibration transfer condition.

As shown in FIG. 8A and FIG. 8B, the first sound generator 801 and the second sound generator 802 are arranged facing a same direction. The first sound generator 801 and the second sound generator 802 are separated by a gap in FIG. 8A. The first sound generator 801 and the second sound generator 802 are separated by a spacer 803 in FIG. 8B. As shown in FIG. 8C and FIG. 8D, the first sound generator 801 and the second sound generator 802 are arranged facing opposite directions. The first sound generator 801 and the second sound generator 802 are separated by a gap in FIG. 8C. The first sound generator 801 and the second sound generator 802 are separated by a spacer 803 in FIG. 8D.

The present disclosure provides the electronic device in which the outer case is configured with the first sound-emitting hole. The outer case is further configured with the second sound-emitting hole and the third sound-emitting hole that are symmetrically arranged. The center between the first sound generator and the second sound generator, the center of the second sound-emitting hole, and the center of the third sound-emitting hole are sequentially arranged along the second axis. The second axis is different from the first axis. In this technical solution, the three sound-emitting holes facing toward different directions are configured on the outer case to achieve outputting the sound in multiple angles (i.e., different directions). Compared with only one sound-emitting hole, the three sound-emitting holes output the sound that is louder and/or multi-directional, thereby improving user's audio experience.

Figure 9:
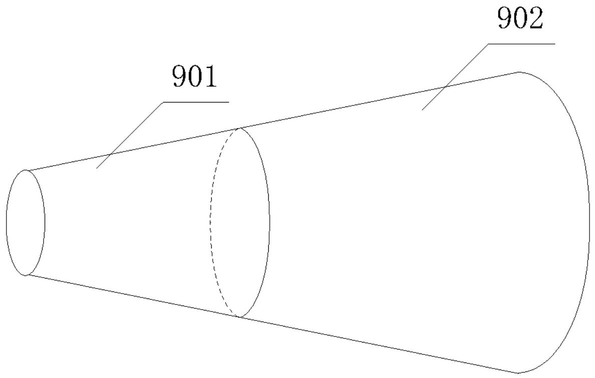
FIG. 9 is a schematic structural diagram of another outer case of an exemplary electronic device according to some embodiments of the present disclosure.

FIG. 9 is a schematic structural diagram of another outer case of an exemplary electronic device according to some embodiments of the present disclosure. As shown in FIG. 9, the electronic device includes: an outer case, a first sound generator, a second sound generator, and a controller. For the descriptions of the structures and functions of the first sound generator, the sound generator, and the controller, references can be made to the descriptions of the previous embodiments, which will not be repeated herein.

Inside the outer case, there is an accommodation space. The accommodation space includes the accommodation space of the first structure or the accommodation space of the first part described in the previous embodiments.

The accommodation space inside the outer case includes a first space 901 and a second space 902. The first space 901 is continuous with the second space 902. The first space 901 is smaller than the second space 902. The first sound generator is provided in the first space 901, and the second sound generator is provided in the second space 902.

The accommodation space inside the outer case includes the first space and the second space.

In some embodiments, the first space and the second space may be the same or different. For example, the first space is larger than the second space. In another example, the first space is smaller than the second space.

As shown in FIG. 9, the first space and the second space are truncated cone structures. But it is not limited thereto. As long as the first space and the second space are continuous, the first space and the second space may be structures in other shapes.

Moreover, the volume parameters of the outer case corresponding to the first space satisfy the in-ear condition.

The first sound generator and the second sound generator are provided respectively in the two spaces. In some embodiments, the two sound generators may be provided in the two spaces according to sizes thereof.

For example, a sound volume of the first sound generator is smaller than a sound volume of the second sound generator. The first sound generator is provided in the smaller first space, and the second sound generator is provided in the larger second space.

For example, the sound volume of the first sound generator and the sound volume of the second sound generator are the same. The first sound generator and the second sound generator are provided respectively in the first space and the second space.

The first sound generator and the second sound generator may be of a same type or may be of different types.

The type of the sound generators includes a first type that generates the sound based on the vibration of a diaphragm or a second type that generate the sound based on the vibration of an iron plate disposed in a magnetic field.

The first sound generator and the second sound generator can be of different types. For example, the first sound generator generates the sound based on the vibration of the diaphragm, and the second sound generator generates the sound based on the vibration of the iron plate disposed in the magnetic field. In another example, the first sound generator generates the sound based on the vibration of the iron plate disposed in the magnetic field, and the second sound generator generates the sound based on the vibration of the diaphragm.

The first sound generator and the second sound generator can be of the same type. For example, the first sound generator and the second sound generator generate the sound based on the vibration of the diaphragm. In another example, the first sound generator and the second sound generator generate the sound based on the vibration of the iron plate patch disposed in the magnetic field.

In some embodiments, the sound generator of the first type includes at least a coil, a diaphragm, or a permanent magnet. The coil and the diaphragm are disposed in the magnetic field of the permanent magnet. The coil encircles the diaphragm and is fixedly connected to the diaphragm. The coil cuts the magnetic field lines of the permanent magnet based on an input current, and drives the diaphragm to emit the sound. The input current corresponds to the audio signal that needs to be outputted.

In some embodiments, the sound generator of the second type includes at least an electromagnet and an iron plate disposed in the magnetic field of the electromagnet. The electromagnet generates a changing alternating magnetic field based on the audio signal that needs to be outputted, such that the iron plate disposed in the magnetic field of the electromagnet vibrates and emits the sound.

The sound volume of the first type sound generator is generally smaller than the sound volume of the second type sound generator. However, because the second type sound generator has a desired sound-emitting effect, under the circumstance that accommodation space is able to accommodate, the second type sound generator has the priority for being selected, thereby ensuring the desired sound effect.

The present disclosure provides the electronic device. The accommodation space inside the outer case of the electronic device includes the first space and the second space. The first space and the second space are continuous. The first space is smaller than the second space. The first sound generator is provided in the first space, and the second sound generator is provided in the second space. The sound volume of the first sound generator is smaller than the sound volume of the second sound generator. In this technical solution, the accommodation space inside the outer case includes two continuous spaces of different sizes. The two sound generators are provided respectively in the first space and the second space. The sound generators are accommodated in the accommodation space inside the outer case to ensure the desired sound effect under the circumstance that the accommodation space is able to accommodate.

Figure 10:
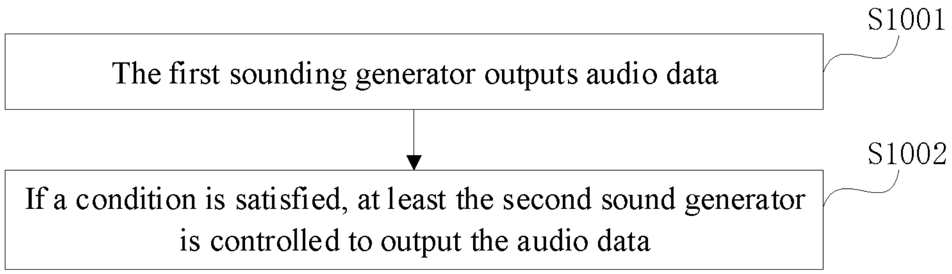
FIG. 10 is a flowchart of an exemplary information processing method according to some embodiments of the present disclosure.

Corresponding to the above embodiments of the electronic device provided by the present disclosure, the present disclosure further provides embodiments of an information processing method applied to the electronic device. FIG. 10 is a flowchart of an exemplary information processing method according to some embodiments of the present disclosure. As shown in FIG. 10, the information processing method can be applied to a controller of an electronic device. The method includes the following processes.

At S1001, the first sounding generator outputs audio data. The first sound generator is disposed inside the outer case of the electronic device, and at least part of the outer case can maintain the positional relationship between the electronic device and the wearer's ear.

The electronic device is provided with two sound generators. The first sound generator is used as a primary sound generator. After the electronic device is started, the first sound generator is activated, and the first sound generator outputs the audio data.

At S1002, if a condition is satisfied, at least the second sound generator outputs the audio data.

The second sound generator is disposed inside the outer case and is different from the first sound generator. During the operation of the electronic device, if the condition is satisfied, at least the second sound generator outputs the audio data.

Outputting the audio data by at least the second sound generator includes: outputting the audio data by the second sound generator, or outputting the audio data by the first sound generator and the second sound generator.

In some embodiments, different conditions can be set, and based on satisfying the different conditions, different ways are selected to output the audio data.

Because the second sound generator is different from the first sound generator, the sound volumes/sound effects outputted by the two sound generators are the same/different. Correspondingly, the two different sound generators are provided in the electronic device. Based on the selection of the different sound generators, the audio data is outputted or the two sound generators are selected to output the audio data to achieve different sound volumes/sound effects.

The present disclosure provides the information processing method. The information processing method includes: outputting the audio data by the first sound generator, where the first sound generator is provided in the outer case of the electronic device, and at least part of the outer case can maintain the positional relationship between the electronic device and the wearer's ear; and if the condition is satisfied, outputting the audio data by at least the second sound generator, where the second sound generator is provided inside the outer case and is different from the first sound generator. In this technical solution, the two sound generators are provided inside the outer case of the electronic device, and the controller provided in the electronic device controls the two sound generators to output the audio, such that the two sound generators are provided in one earphone. Compared with the earphone provided with only one sound generator, the earphone provided with the two sound generators can achieve a relatively loud sound and/or a relatively good sound effect.

Figure 11:
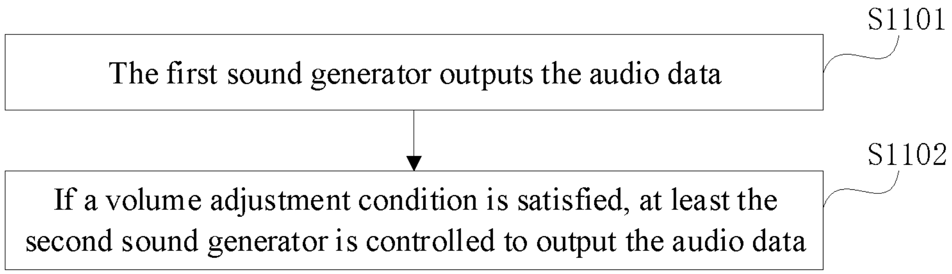
FIG. 11 is a flowchart of another exemplary information processing method according to some embodiments of the present disclosure.

FIG. 11 is a flowchart of another exemplary information processing method according to some embodiments of the present disclosure. The method can be applied to the controller of the electronic device. The method includes the following processes.

At S1101, the first sound generator outputs the audio data. S1101 is consistent with S1001, and details will not be described herein.

At S1102, if a sound volume adjustment condition is satisfied, at least the second sound generating outputs the audio data.

A first sound volume of the audio data outputted from the first sound generator is lower than a second sound volume of the audio data outputted by at least the second sound generator.

The condition is the sound volume adjustment condition. Specifically, the condition may be a condition for increasing the sound volume.

The first sound volume of the audio data outputted from the first sound generator is lower than the sound volume of the audio data outputted from the second sound generator. Alternatively, the first sound volume of the audio data outputted from the first sound generator is lower than the sound volume of the audio data outputted from the first sound generator and the second sound generator.

For example, the first sound volume of the audio data outputted from the first sound generator has a range approximately between 1 and 30. The sound volume of the audio data outputted from the second sound generator has a range approximately between 1 and 50. The sound volume of the audio data outputted from the first sound generator and the second sound generator has a range approximately between 51 and 100.

In some embodiments, when the sound volume adjustment condition is to control the sound volume adjustment in a range approximately between 1 and 30, the first sound generator alone can be used to output the audio data. When the sound volume adjustment condition is to control the sound volume adjustment in a range approximately between 31 and 50, the second sound generator alone can be used to output the audio data. When the sound volume adjustment condition is to control the sound volume adjustment in a range approximately between 51 and 100, both the first sound generator and the second sound generator can be used to output the audio data.

In some embodiments, the sound generator of the electronic device that outputs the audio data is switched from the first sound generator to the second sound generator or a combination of the first sound generator and the second sound generator to achieve increasing the sound volume of the audio data outputted from the electronic device.

In the information processing method provided by the present disclosure, if the sound volume adjustment condition is satisfied, the sound generator of the electronic device that outputs the audio data is switched from the first sound generator to at least the second sound generator, such that the sound volume outputted from the electronic device can be adjusted in a relatively large range.

Figure 12:
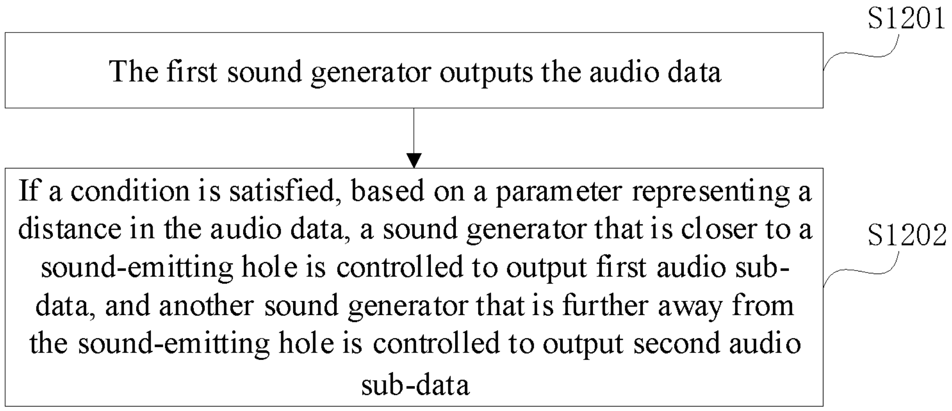
FIG. 12 is a flowchart of another exemplary information processing method according to some embodiments of the present disclosure.

FIG. 12 is a flowchart of another exemplary information processing method according to some embodiments of the present disclosure. The method may be applied to the controller of the electronic device. As shown in FIG. 12, the method includes the following processes.

At S1201, the first sound generator outputs the audio data. S1201 is consistent with S1001, and details will not be described herein.

At S1202, if a condition is satisfied, based on a parameter representing a distance in the audio data, a sound generator that is closer to a sound-emitting hole is controlled to output first audio sub-data, and another sound generator further away from the sound-emitting hole is controlled to output second audio sub-data.

If the condition is satisfied, the first sound generator and the second sound generator output the audio data.

In some embodiments, the condition includes: having obtained an instruction to start stereo, or having obtained the audio data supporting stereo.

When the first sound generator is disposed close to the sound-emitting hole, the second sound generator is disposed distant from the sound-emitting hole.

In some embodiments, if the condition is satisfied, the first sound generator outputs the first audio sub-data, and the second sound generator outputs the second audio sub-data.

The audio data includes the parameter representing the distance. The first audio sub-data includes a parameter representing a relatively short distance, and the second audio sub-data includes a parameter representing a relatively far distance.

In some embodiments, the sound generator of the electronic device that is closer to the sound-emitting hole is controlled to output the first audio sub-data, and the sound generator of the electronic device that is further away from the sound-emitting hole is controlled to output the second audio sub-data, such that the electronic device outputs a stereo sound effect reflecting far and close distances.

The sound-emitting hole may be the first sound-emitting hole.

Because the electronic device may be configured with a plurality of sound-emitting holes, the audio data may be outputted through the plurality of sound-emitting holes to reach the wearer's ear, such that the wearer can hear a loud sound effect.

Tn the information processing method provided by the present disclosure, if the condition is satisfied, the first sound generator and the second sound generator output the audio data. Based on the parameter representing the distance in the audio data, the sound generator of the electronic device that is closer to the sound-emitting hole is controlled to output the first audio sub-data, and the sound generator of the electronic device that is further away from the sound-emitting hole is controlled to output the second audio sub-data. In this technical solution, the two sound generators of the electronic device are coordinated to output the audio sub-data with different distance parameters respectively, such that the output has the stereo sound effect reflecting the far and close distances.

Figure 13:
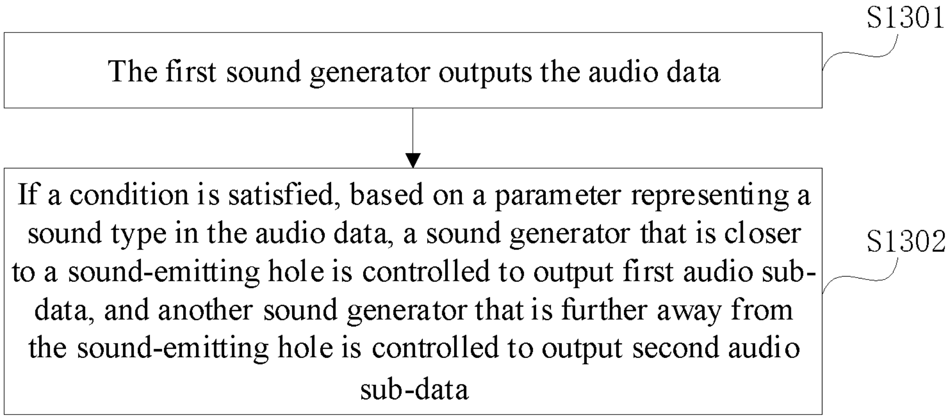
FIG. 13 is a flowchart of another exemplary information processing method according to some embodiments of the present disclosure.

FIG. 13 is a flowchart of another exemplary information processing method according to some embodiments of the present disclosure. The method may be applied to the controller of the electronic device. As shown in FIG. 13, the method includes the following processes.

At S1301, the first sound generator outputs the audio data. S1301 is consistent with S1001 in the previous embodiments, and the details will not be described herein.

At S1302, if a condition is satisfied, based on a parameter representing a sound type in the audio data, a sound generator that is closer to a sound-emitting hole is controlled to output first audio sub-data, and another sound generator that is further away from the sound-emitting hole is controlled to output second audio sub-data.

If the condition is satisfied, the first sound generator and the second sound generator output the audio data.

In some embodiments, the condition includes: having obtained an instruction to start stereo, or having obtained the audio data supporting stereo.

The first sound generator is disposed closer to the sound-emitting hole, the second sound generator is disposed further away from the sound-emitting hole. If the condition is satisfied, the first sound generator outputs the first audio sub-data, and the second sound generator outputs the second audio sub-data.

The audio data includes the parameter representing the sound type. The first audio sub-data includes a parameter representing the sound type to be a first type, and the second audio sub-data includes the parameter representing the sound type to be the first type.

For example, the first type is a human voice, and the second type is a background sound.

In some embodiments, different sound generators of the electronic device output the audio sub-data of different types. For example, the sound generator of the electronic device that is closer to the sound-emitting hole is controlled to output the audio sub-data with the parameter of the first type, and the sound generator of the electronic device that is further away from the sound-emitting hole is controlled to output the second audio sub-data with the parameter of the first type, such that the electronic device outputs a stereo sound effect including the human voice and the background sound.

In the information processing method provided by the present disclosure, if the condition is satisfied, based on the parameter representing the sound type in the audio data, the sound generator of the electronic device that is closer to the sound-emitting hole is controlled to output the first audio sub-data, and the sound generator of the electronic device that is further away from the sound-emitting hole is controlled to output the second audio sub-data. In this technical solution, the two sound generators of the electronic device are coordinated to output the audio sub-data with different sound type parameters respectively, such that the output has the stereo sound effect reflecting the different sound types.

Figure 14:
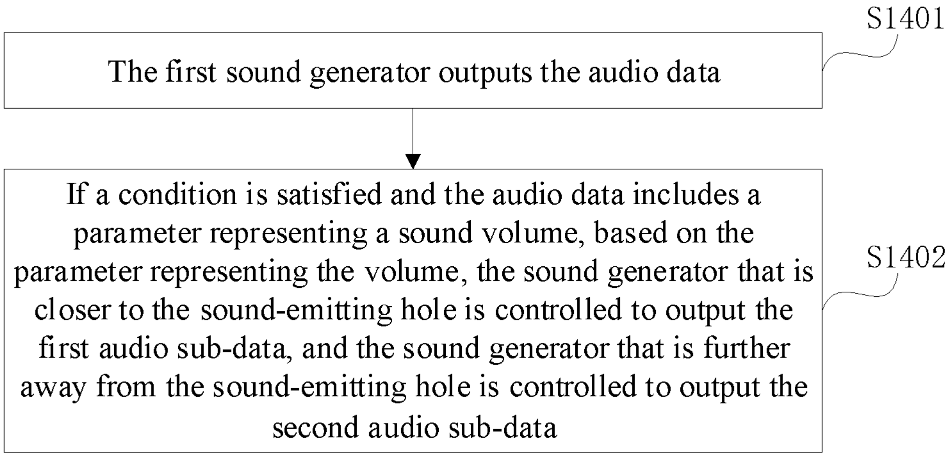
FIG. 14 is a flowchart of another exemplary information processing method according to some embodiments of the present disclosure.

FIG. 14 is a flowchart of another exemplary information processing method according to some embodiments of the present disclosure. The method may be applied to the controller of the electronic device. As shown in FIG. 14, the method includes the following processes.

At S1401, the first sound generator outputs the audio data. S1401 is consistent with S1001 in the previous embodiments, and the details will not be described herein.

At S1402, if a condition is satisfied and the audio data includes a parameter representing a sound volume, based on the parameter representing the sound volume, the sound generator that is closer to the sound-emitting hole is controlled to output the first audio sub-data, and the sound generator that is further away from the sound-emitting hole is controlled to output the second audio sub-data.

If the condition is satisfied, the first sound generator and the second sound generator output the audio data.

In some embodiments, the condition includes: having obtained an instruction to start stereo, or having obtained the audio data supporting stereo.

The first sound generator is disposed closer to the sound-emitting hole, the second sound generator is disposed further away from the sound-emitting hole. If the condition is satisfied, the first sound generator outputs the first audio sub-data, and the second sound generator outputs the second audio sub-data.

The audio data includes the parameter representing the sound volume. The first audio sub-data includes a parameter representing the sound type to be a first sound volume, and the second audio sub-data includes the parameter representing the sound type to be a second sound volume.

The first sound volume is louder than the second sound volume. That is, the audio data includes the audio data with loud sound and the audio data with quiet sound.

In some embodiments, different sound generators of the electronic device output the audio sub-data of different types. For example, the sound generator of the electronic device that is closer to the sound-emitting hole is controlled to output the audio sub-data with the first sound volume, and the sound generator of the electronic device that is further away from the sound-emitting hole is controlled to output the second audio sub-data with the second sound volume, such that the electronic device outputs a stereo sound effect including a near and loud sound and a far and quiet sound.

In the information processing method provided by the present disclosure, if the condition is satisfied and the audio data includes the parameter representing the sound volume, based on the parameter representing the sound volume in the audio data, the sound generator of the electronic device that is closer to the sound-emitting hole is controlled to output the first audio sub-data, and the sound generator of the electronic device that is further away from the sound-emitting hole is controlled to output the second audio sub-data. In this technical solution, the two sound generators of the electronic device are coordinated to output the audio sub-data with different sound volume parameters respectively, such that the output has the stereo sound effect reflecting the different sounds.

Figure 15:
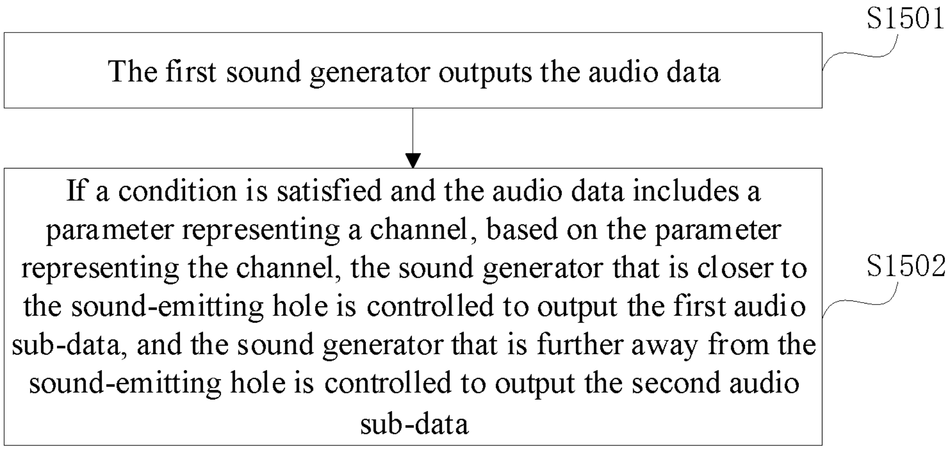
FIG. 15 is a flowchart of another exemplary information processing method according to some embodiments of the present disclosure.

FIG. 15 is a flowchart of another exemplary information processing method according to some embodiments of the present disclosure. The method may be applied to the controller of the electronic device. As shown in FIG. 15, the method includes the following processes.

At S1501, the first sound generator outputs the audio data. S1501 is consistent with S1001 in the previous embodiments, and the details will not be described herein.

At S1502, if a condition is satisfied and the audio data includes a parameter representing a channel, based on the parameter representing the channel, the sound generator that is closer to the sound-emitting hole is controlled to output the first audio sub-data, and the sound generator that is further away from the sound-emitting hole is controlled to output the second audio sub-data.

If the condition is satisfied, the first sound generator and the second sound generator output the audio data.

In some embodiments, the condition includes: having obtained an instruction to start stereo, or having obtained the audio data supporting stereo.

The first sound generator is disposed closer to the sound-emitting hole, the second sound generator is disposed further away from the sound-emitting hole. If the condition is satisfied, the first sound generator outputs the first audio sub-data, and the second sound generator outputs the second audio sub-data.

The audio data includes the parameter representing the channel. The first audio sub-data includes a parameter representing a first channel, and the second audio sub-data includes a parameter representing a second channel.

The first channel and the second channel may be the left channel and the right channel, respectively.

In some embodiments, different sound generators of the electronic device output the audio sub-data of different types. For example, the sound generator of the electronic device that is closer to the sound-emitting hole is controlled to output the audio sub-data with the first channel, and the sound generator of the electronic device that is further away from the sound-emitting hole is controlled to output the second audio sub-data with the second channel, such that the electronic device outputs a stereo sound effect including the left channel and the right channel.

The first channel and the second channel may be the left/right channel and a bass channel, respectively.

In some embodiments, when the electronic device is an earphone used alone, the first channel and the second channel are the channel in the corresponding direction of the earphone and the bass channel, respectively. If the earphone is a left earphone, the first channel and the second channel are the left channel and the bass channel, respectively. If the earphone is a right earphone, the first channel and the second channel are the right channel and the bass channel, respectively.

Therefore, in the information processing method provided by the present disclosure, if the condition is satisfied and the audio data includes the parameter representing the channel, based on the parameter representing the channel in the audio data, the sound generator of the electronic device that is closer to the sound-emitting hole is controlled to output the first audio sub-data, and the sound generator of the electronic device that is further away from the sound-emitting hole is controlled to output the second audio sub-data. In this technical solution, the two sound generators of the electronic device are coordinated to output the audio sub-data with different channel parameters respectively, such that the output has the stereo sound effect.

Figure 16:
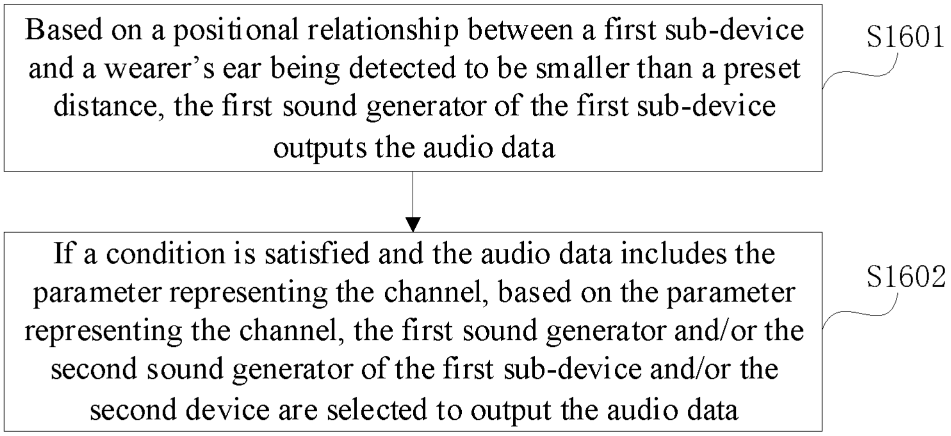
FIG. 16 is a flowchart of another exemplary information processing method according to some embodiments of the present disclosure.

FIG. 16 is a flowchart of another exemplary information processing method according to some embodiments of the present disclosure. The method may be applied to the controller of the electronic device. The electronic device includes two sub-devices (i.e., earphones) arranged in pairs. As shown in FIG. 16, the method includes the following processes.

At S1601, based on a positional relationship between a first sub-device and a wearer's ear being detected to be smaller than a preset distance, the first sound generator of the first sub-device outputs the audio data. S1601 is consistent with S1001 in the previous embodiments, and the details will not be described herein.

A positional relationship between a second sub-device and the wearer's ear is greater than the preset distance.

At S1602, if a condition is satisfied, based on the parameter, in the audio data, that represents the channel, the first sound generator and/or the second sound generator of the first sub-device and/or the second device is selected to output the audio data.

The condition includes whether the positional relationship between the first sub-device and/or the second sub-device and the wearer's ear is smaller than the preset distance, that is, whether the two sub-devices are worn.

Moreover, the condition further includes having obtained an instruction to start stereo or having obtained the audio data supporting stereo.

The audio data include the parameter representing the channel. The first audio sub-data include the parameter representing the first channel, and the second audio sub-data includes the parameter representing the second channel.

If the positional relationship between the first sub-device and the wearer's ear and the positional relationship between the second sub-device and the wearer's ear both are smaller than the preset distance, it indicates that the two sub-devices both are worn. Based on the parameter representing the channel, the sound generator of the first sub-device outputs the first audio sub-data, and the sound generator of the second sub-device outputs the second audio sub-data. The two sub-devices output the audio sub-data of the corresponding channel.

If the positional relationship between the first sub-device and the wearer's ear is smaller than the preset distance, and the positional relationship between the second sub-device and the wearer's ear is greater than the preset distance, based on the parameter representing the channel, the sound generator of the first sub-device that is closer to the sound-emitting hole is controlled to output the first audio sub-data, and the sound generator of the first sub-device that is further away from the sound-emitting hole is controlled to output the second audio sub-data.

If the positional relationship between the second sub-device and the wearer's ear is smaller than the preset distance, and the positional relationship between the first sub-device and the wearer's ear is greater than the preset distance, based on the parameter representing the channel, the sound generator of the second sub-device that is closer to the sound-emitting hole is controlled to output the second audio sub-data, and the sound generator of the second sub-device that is further away from the sound-emitting hole is controlled to output the first audio sub-data.

The first sub-device is the left earphone. The first audio sub-data is for the first channel (e.g., the left channel). The second sub-device is the right earphone. The second audio sub-data is for the second channel (e.g., the right channel).

In some embodiments, when the wearer simultaneously wears the two sub-devices, the two sub-devices can output the audio sub-data of the corresponding channels, respectively. The audios of the corresponding channels are outputted to the wearer's ears respectively, thereby creating the stereo sound effect over the wearer's head.

In some embodiments, when the wearer wears only one sub-device, the two sound generators of the sub-device can output the audio sub-data of different types, such that the sub-device creates the stereo sound effect with the left and right channels.

In the information processing method provided by the present disclosure, based on a wearing state of the electronic device, different audio output modes are selected for the electronic device. When the two sub-devices of the electronic device are both worn, the two sub-devices output the audio sub-data of the corresponding channels, respectively. When only one sub-device of the electronic device is worn, the two sound generators of the sub-device are coordinated to output the audio sub-data with different channel parameters, thereby achieving the stereo sound effect.

The various embodiments in this specification are described in a progressive manner, and each embodiment focuses on the differences from other embodiments, and the same and similar parts between the various embodiments can be referred to each other.

The above description of the embodiments is provided to enable those skilled in the art to make or use the present disclosure. Various modifications to these embodiments will be readily apparent to those skilled in the art, and the generic principles defined herein may be implemented in other embodiments without departing from the spirit or scope of the present disclosure. Therefore, the disclosure is not intended to be limited to the embodiments shown herein, but is to be accorded the widest scope consistent with the principles and novel features provided herein.

What is claimed is:

1. An electronic device comprising:

an outer case, at least a portion of the outer case being configured to maintain a positional relationship between the electronic device and a wearer's ear;

a first sound generator and a second sound generator both provided inside the outer case; and a controller configured to control the first sound generator and the second sound generator to output sounds;

wherein:

the outer case includes a first accommodation space and a second accommodation space continuously connected to each other;

the first accommodation space is smaller than the second accommodation space;

the first sound generator is provided in the first accommodation space and the second sound generator is provided in the second accommodation space; and a sound volume of the first sound generator is smaller than a sound volume of the second sound generator.

2. The electronic device according to claim 1, wherein:

the outer case further includes a first structure and a second structure that are fixedly connected to each other;

a volume parameter of the first structure satisfies an in-ear condition, and the first structure includes the first accommodation space and the second accommodation space; and the second structure is configured to maintain the positional relationship between the electronic device and the wearer's ear.

3. The electronic device according to claim 2, wherein:

the first structure is a cylindrical structure;

the volume parameter of the first structure satisfying the in-ear condition includes a diameter of the cylindrical structure satisfying the in-ear condition; and the second structure is a hook-like structure with a curvature and being hung on an outer portion of the wearer's ear.

4. The electronic device according to claim 1, wherein:
the outer case includes a first part and a second part;
a volume parameter of the first part is greater than a volume parameter of the second part, and the first part includes the first accommodation space and the second accommodation space; and
the volume parameter of the first part satisfies an in-ear condition, and the first part is configured to maintain the positional relationship between the electronic device and the wearer's ear.

5. The electronic device according to claim 4, wherein:
the first part is a cylindrical structure;
the volume parameter of the first part satisfying the in-ear condition includes a diameter of the cylindrical structure satisfying the in-ear condition; and
the second structure is a cuboid structure having a diameter smaller than the diameter of the first part.

6. The electronic device according to claim 1, wherein:
a sound-emitting hole is provided at the outer case; and
a center of the sound-emitting hole, a center of the first sound generator, and a center of the second sound generator are sequentially arranged along an axis.

7. The electronic device according to claim 6, wherein:
a sound-emitting direction of the first sound generator faces toward the sound-emitting hole; and
a size of the first sound emitting hole matches a size of the first sound generator.

8. The electronic device according to claim 7, wherein:
a sound outputted from the second sound generator is reflected by an inner wall of the outer case to emit through the sound-emitting hole.

9. The electronic device according to claim 6, wherein:
the sound-emitting hole is a first sound-emitting hole and the axis is a first axis;
the outer case further includes a second sound-emitting hole and a third sound-emitting hole that are symmetrically arranged; and
a center between the first sound generator and the second sound generator, a center of the second sound-emitting hole, and a center of the third sound-emitting hole are arranged along a second axis, the second axis being different from the first axis.

10. The electronic device according to claim 9, wherein:
the sound outputted from the first sound generator emits directly through the first sound-emitting hole and indirectly through the second sound-emitting hole and the third sound-emitting hole after being reflected by the inner wall of the outer case; and
the sound outputted from the second sound generator emits indirectly through the first sound-emitting hole, the second sound-emitting hole, and the third sound-emitting hole after being reflected by the inner wall of the outer case.

11. The electronic device according to claim 1, wherein:
the first sound generator includes a diaphragm; and
the second sound generator includes an iron plate.

12. The electronic device according to claim 1, further comprising:
a connection component configured to connect to other electronic equipment.

13. The electronic device according to claim 1, further comprising:
a power supply configured to supply power to the first sound generator, the second sound generator, and the controller.

14. An information processing method comprising:
controlling a first sound generator provided in an outer case of an electronic device to output audio data, at least a portion of the outer case being configured to maintain a positional relationship between the electronic device and a wearer's ear; and
in response to a condition being satisfied, controlling at least a second sound generator provided in the outer case of the electronic device to output audio data, the second sound generator being different from the first sound generator;
wherein:
a first sound volume of audio data outputted from the first sound generator is smaller than a second sound volume of audio data outputted from the second sound generator; and
in response to the condition being satisfied, controlling at least the second sound generator to output the audio data includes:
in response to a sound volume adjustment condition being satisfied, controlling at least the second sound generator to output the audio data.

15. The method according to claim 14, wherein controlling at least the second sound generator to output the audio data includes:
based on a parameter representing a distance in the audio data, controlling one of the first sound generator and the second sound generator that is closer to a sound-emitting hole to output first audio sub-data, and controlling another one of the first sound generator and the second sound generator that is further away from the sound-emitting hole to output second audio sub-data.

16. The method according to claim 14, wherein controlling at least the second sound generator to output the audio data includes:
based on a parameter representing a sound type in the audio data, controlling one of the first sound generator and the second sound generator that is closer to the sound-emitting hole to output first audio sub-data, and controlling another one of the first sound generator and the second sound generator that is further away from the sound-emitting hole to output second audio sub-data.

17. The method according to claim 14, wherein controlling at least the second sound generator to output the audio data includes:
in response to the condition being satisfied and the audio data including a parameter representing the sound volume, controlling one of the first sound generator and the second sound generator that is closer to the sound-emitting hole to output the first audio sub-data, and controlling another one of the first sound generator and the second sound generator that is further away from the sound-emitting hole to output the second audio sub-data.

18. The method according to claim 14, wherein controlling at least the second sound generator to output the audio data includes:
in response to the condition being satisfied, based on a parameter representing a channel in the audio data, controlling one of the first sound generator and the second sound generator that is closer to a sound-emitting hole to output the first audio sub-data, and controlling another one of the first sound generator and the second sound generator that is further away from the sound-emitting hole to output the second audio sub-data.

19. An electronic device comprising:

an outer case, at least a portion of the outer case being configured to maintain a positional relationship between the electronic device and a wearer's ear;

a first sound generator and a second sound generator both provided inside the outer case; and a controller configured to control the first sound generator and the second sound generator to output sounds;

wherein:

a first sound-emitting hole is provided at the outer case;

a center of the sound-emitting hole, a center of the first sound generator, and a center of the second sound generator are sequentially arranged along a first axis;

the outer case further includes a second sound-emitting hole and a third sound-emitting hole that are symmetrically arranged; and a center between the first sound generator and the second sound generator, a center of the second sound-emitting hole, and a center of the third sound-emitting hole are arranged along a second axis, the second axis being different from the first axis.

* * * * *